United States Patent [19]

O'Brien

[11] Patent Number: 6,007,343

[45] Date of Patent: Dec. 28, 1999

[54] EDUCATIONAL BIOLOGY ASSEMBLY

[76] Inventor: Kevin J. O'Brien, 134 High St., Norwell, Mass. 02061

[21] Appl. No.: 09/138,934

[22] Filed: Aug. 24, 1998

[51] Int. Cl.[6] .................................................. G09B 23/00
[52] U.S. Cl. ........................................... 434/295; 435/176
[58] Field of Search .............................. 434/295; 435/126

[56] References Cited

U.S. PATENT DOCUMENTS 4,452,892  6/1984  Rosevear ................................. 435/176

Primary Examiner—Sam Rimell
Attorney, Agent, or Firm—John P. McGonagle

[57] ABSTRACT

A biology assembly for educating and demonstrating a biological process. The assembly is comprised of a treated grid formed from a fiberglass mesh. The mesh is then dipped into a nutrient agar. The nutrient may be adjusted to accommodate the microbe being grown. Test chemicals may also be added.

1 Claim, 3 Drawing Sheets

EDUCATIONAL BIOLOGY ASSEMBLY

BACKGROUND OF THE INVENTION

This invention relates to education and demonstration, and in particular to a biology assembly for educating and demonstrating a biological process.

Because of the very small size of microbes and also their slow growth rates, it is very difficult for a student to observe and comprehend relative sizes and growth rates of microbes. The present invention offers a way to alleviate many of the frustrations encountered by students, from lower grade levels through graduate and post graduate levels, as they attempt to view microbes.

SUMMARY OF THE INVENTION

The present invention provides a biology assembly for educating and demonstrating a biological process. The assembly is comprised of a treated grid which has a low cost and offers simplicity in setup and long term durability.

The treated grid is formed from a mesh, preferably made from fiberglass but also optionally from other material, which is cut into a desired form having a specified mesh boundary. The mesh is then dipped into a nutrient agar. The nutrient may be adjusted to accommodate the microbe being grown. Test chemicals may also be added to check uptake rates, biochemical metabolic rates, etc. The finished grid may then be dried for later use, shipment or shipped as a gel. Microorganisms may be stored or shipped on the gel or in a separate container. This results in a substantially reduced shipping weight since water is almost eliminated.

Biological results obtained from the treated grid may be reproduced consistently with success and allow students to observe organisms with less difficulty. Measurements are compared to the grid dimensions, thereby allowing students to immediately comprehend relative size. Students can better visualize the comparative size of an organism after using the present invention.

These together with other objects of the invention, along with various features of novelty which characterize the invention, are pointed out with particularity in the claims annexed hereto and forming a part of this disclosure. For a better understanding of the invention, its operating advantages and the specific objects attained by its uses, reference should be had to the accompanying drawings and descriptive matter in which there is illustrated a preferred embodiment of the invention.

DETAILED DESCRIPTION OF THE INVENTION

Figure 1:
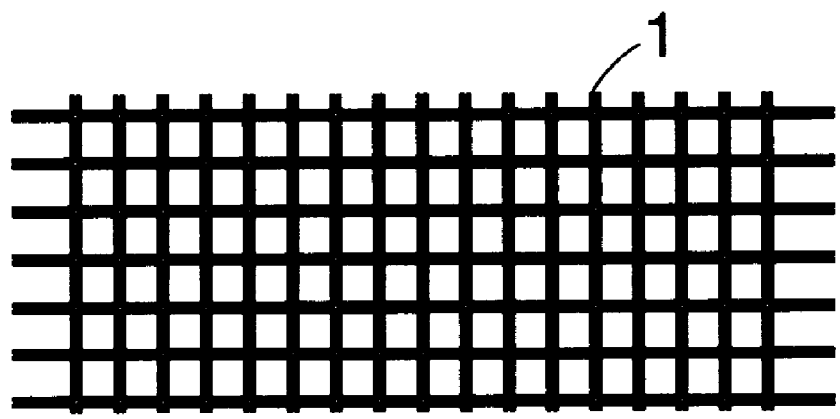
FIG. 1 is a plan view of an untreated grid.
Figure 2:
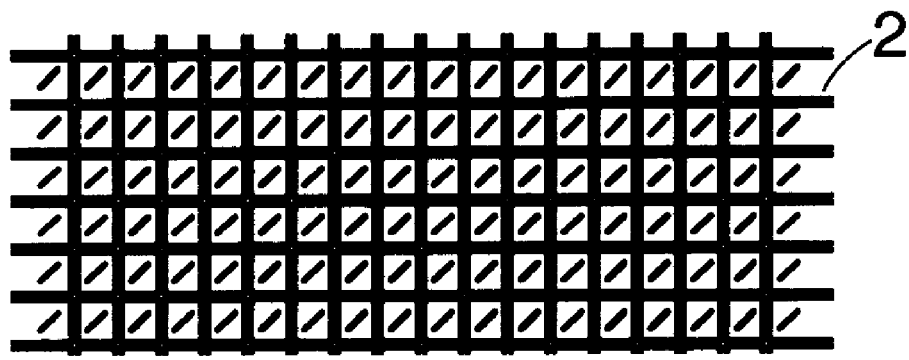
FIG. 2 is a view of the grid of FIG. 1 treated.
Figure 3:
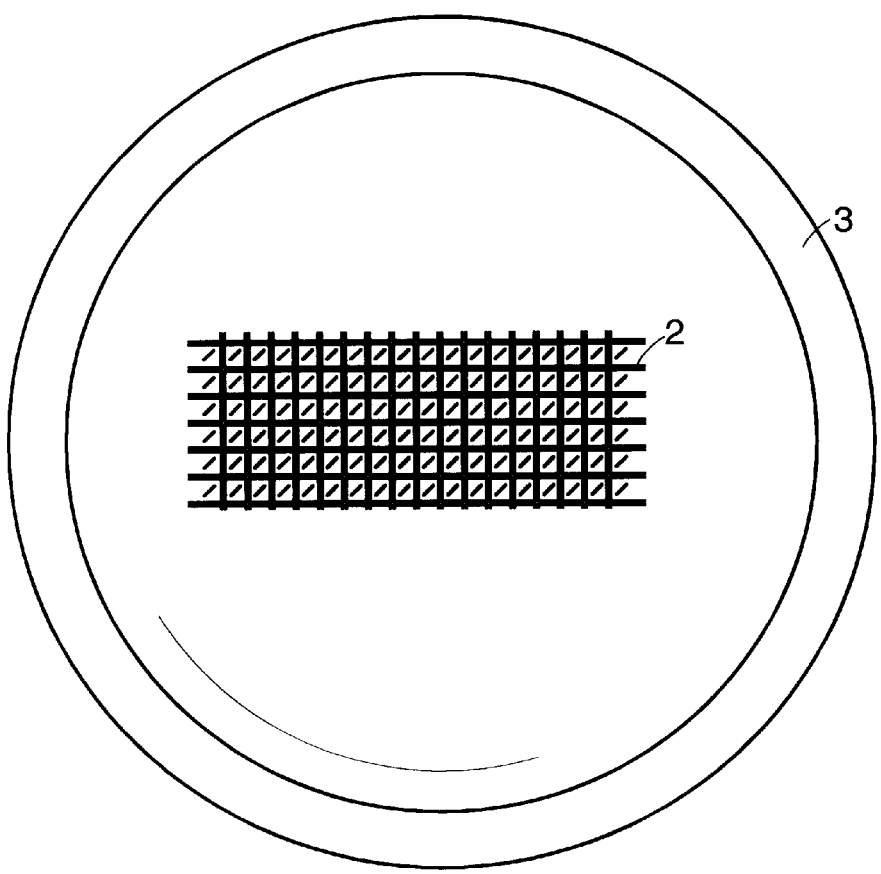
FIG. 3 is a top view of the grid of FIG. 2 placed in a petri dish.
Figure 4:
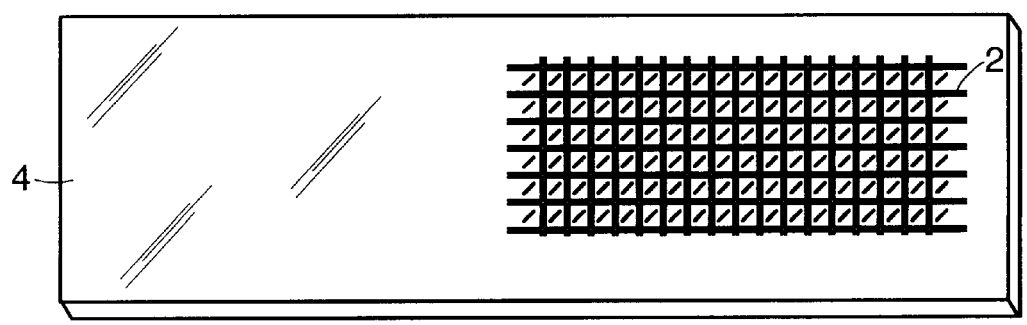
FIG. 4 is a view of the grid of FIG. 3 placed on a microscope slide.
Figure 5:
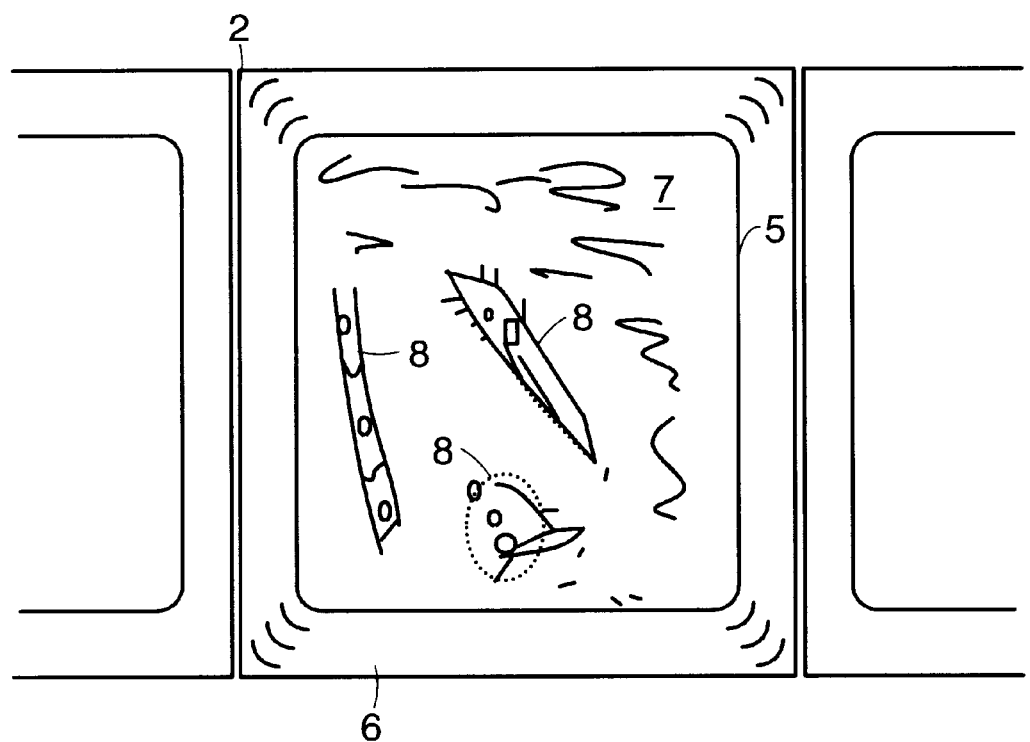
FIG. 5 is a close-up view of a portion of the grid of FIG. 4 with microorganisms.

The treated grid 2 of the present invention may be either backed or unbacked. The grids 2 also may have variable spacing and shape. The dried or wet mesh of the treated grid may be placed in culture dish 3, i.e., in this embodiment four inch diameter petri bowls with sterile nutrient water or sterile pond water. The mesh may then be seeded with the desired organism or may have the colonial organisms prepacked on the gel. Students or lab technicians may then use the grids in nutrient tests, biochemical assays, population growth experiments, daphnia grid trapping for heart rate measurements and a host of other applications. The grid may be taken from its container with forceps and applied to a clean glass slide 4 for observation. When the observation is completed, the grid 2 may then be returned to the container 3 for added growing time. After observation adding two drops of sterile pond water prevents dehydration. Use of a coverslip is optional.

This method works especially well with high school students and permits controlled observation of motile microorganisms over long periods of time. Growth experiments with paramecium, vorticella, nematodes, various blue green and green algae, fungi and some small crustaceans and worms have been very successful. Growth for as long as five months has been achieved with little or no attention to 4 inch growth bowls containing grids. To date vorticella has grown best on the grid surfaces. Fresh nutrient may be supplied by adding a fresh sterile treated grid.

The grids have the advantage that they permit a student to see the size of an organism compared to, e.g., a 2×2 mm mesh boundary. In addition the grid limits the movement of organisms corralling them in a cornered space. The curved meniscus 5 created by the solidified gel 6 encourages protozoa to turn back and circle so that they can more easily be observed. The nutrient surface 7 often slows rapid moving organisms to a standstill, thereby augmenting observation. The nutrient agar is excellent relative to optical clarity and locks organisms in a two dimensional plane. The microbes 8 cannot move downward and generally glide along the gel surface like a skater.

A treated grid 2 may also be made by the students. Fiberglass tape, a fiberglass mesh used in construction work such as sheet rock construction, may be acquired at a local hardware store or supplied as part of a kit. Glass or plastic coverslips are also obtained. The mesh is cut into pieces slightly smaller than the size of the coverslip. The mesh pieces are tacky, so a corner of each edge is stuck to a clean surface. Each coverslip is positioned on clean paper toweling and three to six sizable drops of nailpolish applied to each coverslip. Silicone or epoxy may be used in place of the nail polish. One mesh piece is positioned squarely on each coverslip using forceps. The mesh is tapped gently into the nailpolish. The mesh attached to the coverslip forms a grid 1. Each grid is placed aside to dry overnight. The nailpolish in each grid forms a meniscus and planer surface within each grid square.

Each dried grid 1 is lowered slowly into a warm nutrient agar at a 30 to 45° angle. The nutrient agar is made from sterile pond water to which about 6% nutrient media has been added. The grid 2 is then immediately removed from the agar. The grid 2 is then cooled.

Nutrient agar is added to a four inch finger bowl, i.e., culture dish 3. A grid 2, mesh side up, is gently lowered into the bowl. Two drops of sterile water are added. A coverslip is optional. Two grids per bowl work well. The bowl is then seeded with microorganisms 8. After ten minutes, the grid 2 is gently removed from the bowl with forceps and placed on a clean slide 4, mesh side up. Two drops of sterile water and a coverslip may be added. A cell count is then carried out. The numbers are recorded. The grid is then gently removed and returned to the bowl. Recounts may be done in subsequent days.

This method is excellent for viewing raw pond water organisms, vorticella, paramecia, blepharisma amoebae, and euglenophytes. Larger organisms, such as nematodes and small crustacea, also grow successfully. The fact that growth and movement is limited works well in the observer's favor. The agar gel allows the organisms attachment and feeding surface, as well as supplemental moisture.

Other applications of the present invention are as follows. Planaria, i.e., 1 mm flatworms, may be kept for long periods of time. The planaria are raised on grids that have nutrient agar and bacterial flora. The grids are then kept either in sealed plastic bags or in four inch finger bowls. Regeneration studies may be conducted in this way for many months. Daphnia or related small crustaceans may be studied by placing the daphnia on a plain grid or grid with agar. Two drops of water are added and the grid observed under microscope. Heart rate and other observable features may be studied. The specimen is then placed back into a jar for later use when finished.

Environmental studies may be performed as follows. Air quality studies may be made by placing sterile, wet nutrient agar grid on a moist towelling and exposing the grid to air for five minutes. Twenty four or forty eight hours later bacterial colonies are counted. The number of colonies per grid square equals a degree of air contamination. The resulting grid may be placed in a projector after proper preparation and the results shown to a class on a screen. For water quality studies, nutrient agar coated grid is placed in a porous holder and exposed to an environmental water sample for a given period of time. The grid is then placed under microscope in a lab and checked for organisms both directly after exposure and after incubation in a dish containing sterile pond water. Radioisotope pickup in the natural environment may also be ascertained by Geiger probe pickup or use of autoradiographic technique. For soil quality studies a potato dextrose agar coated grid is placed into a holder and surrounded with a moist soil ball for a set time period. The grid is then removed and examined for nematode round worms and other organisms.

The light weight of the grids make them ideal for space work. Protozoa grown on grids and flown into space can be retrieved and studies compared to earth grown parallel clones for population density changes, mutations, and the like.

The effect of radiation on organism may be studied by taking protozoa grown on a grid strip and cutting the grid into equal sized pieces. The different pieces are then exposed to different rads at a local hospital. The effects of radiation on organisms may then be observed in terms of population changes and other factors. The effects of radiochemicals, fluorescent chemicals and point radiation on organisms may be studied as follows. A radiosource can be fixed to the center of a grid and organisms grown on the grid. The long term effects of continual radiation may be ascertained by checking the grid squares for population changes, etc. Radiochemicals fed to micro organisms can be ascertained with either autoradiographic application or Geiger probe pickup.

Fungal studies may also be made. Fungal spores are placed in the central well of a sabarouds agar coated grid. The grid is then placed in a chamber to which has been added moisture retaining gel beads or paper. The grid is left in the chamber for twenty-four hours. The grid is then checked for septate condition and other identifying features. The cover of the dish into which the grid has been placed is opened and observed for spore case development to further augment identification of organism. The sexual reproduction of fungi may be observed by placing neurospora (bread mold) plus spores on one end of a sabarouds agar coated grid and minus spores on the other. Formation of sexually produced zygospores may be observed after placing the grid in a moist chamber for twenty-four hours.

Slugs and snails may be observed as follows. Place slugs or snails on grids thickly coated with nutrient agar and place the grids in a moist chamber. They can be kept for extended periods in this way as an alternative to other methods. The eggs of frogs or other amphibia, fish worms, arthropod eggs, and possibly mammals, could be suspended on either plain or treated grids. The separation of eggs to prevent fungal attack and the treatment of eggs with protective biochemicals or growth enhancing substances could then be carried out. Visibility of ova could be improved for photographic purposes.

It is understood that the above-described embodiment is merely illustrative of the application. Other embodiments may be readily devised by those skilled in the art which will embody the principles of the invention and fall within the spirit and scope thereof.

I claim:

1. A method of preparing a biology assembly for educating and demonstrating a biological process, comprising the steps of:

cutting a fiberglass mesh into rectangular pieces;

applying epoxy to one side of a transparent coverslip;

placing a fiberglass piece of mesh onto the epoxy thereby forming a grid;

pressing the mesh through the epoxy to the coverslip thereby forming a meniscus and planer surface within each grid square;

lowering the grid slowly into a warm nutrient agar at a 30 to 45° angle, said nutrient agar being made from sterile pond water to which about 6% nutrient media has been added;

removing said grid from said nutrient agar;

cooling said grid;

adding nutrient agar to a culture dish;

lowering a grid, mesh side up, into said dish;

adding a plurality of drops of sterile water;

seeding said dish with microorganisms;

removing said grid from said dish;

examining said grid;

returning said grid to said dish.

* * * * *